(12) United States Patent  
Starbuck et al.

(10) Patent No.: US 7,512,400 B2  
(45) Date of Patent: Mar. 31, 2009

(54) INTEGRATED MESSAGING USER INTERFACE WITH MESSAGE-BASED LOGGING

(75) Inventors: Bryan T. Starbuck, Redmond, WA (US); Deana R. Fuller, Seattle, WA (US); Martijn E. Van Tilburg, Seattle, WA (US); Mark Anthony McCabe, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 2 days.

(21) Appl. No.: 10/835,829

(22) Filed: Apr. 30, 2004

(65) Prior Publication Data

US 2005/0243979 A1     Nov. 3, 2005

(51) Int. Cl.
*H04M 3/42*     (2006.01)
(52) U.S. Cl. .................... 455/414.1; 379/88.21
(58) Field of Classification Search .......... 379/88.17, 379/88.21, 93.23; 345/333; 455/455, 414.1, 455/403
See application file for complete search history.

(56) References Cited

U.S. PATENT DOCUMENTS

| | | | | |
|---|---|---|---|---|
| 5,848,356 A | * | 12/1998 | Jambhekar et al. | 455/403 |
| 6,064,725 A | * | 5/2000 | Nakanishi | 379/140 |
| 6,157,379 A | * | 12/2000 | Singh | 715/866 |
| 6,771,640 B2 | * | 8/2004 | Karamchedu et al. | 370/352 |
| 7,181,698 B2 | * | 2/2007 | Shahrbabaki et al. | 715/790 |
| 7,248,677 B2 | * | 7/2007 | Randall et al. | 379/93.23 |
| 2002/0027976 A1 | * | 3/2002 | Wilcox et al. | 379/67.1 |
| 2002/0132638 A1 | * | 9/2002 | Plahte et al. | 455/555 |
| 2003/0194077 A1 | * | 10/2003 | Ramey | 379/221.01 |
| 2004/0013243 A1 | * | 1/2004 | Harris | 379/67.1 |
| 2004/0119761 A1 | * | 6/2004 | Grossman et al. | 345/854 |
| 2004/0148392 A1 | * | 7/2004 | Cotte | 709/225 |

\* cited by examiner

*Primary Examiner*—Alexander Eisen
*Assistant Examiner*—Wayne Cai
(74) *Attorney, Agent, or Firm*—Workman Nydegger (57) ABSTRACT

Mechanisms for organizing messages across different message types. This may be accomplished by using a single integrated user interface in which messages across a variety of different message types are represented in a common way. For example, the user experience of placing a telephone call is standardized, regardless of the actual telephone technology (Cell Phone, VoIP, or POTS) used to conduct the telephone conversation. Also, addition to a general log that includes the overall list of messages, each message also has a separate, message-based log, thereby allowing for more flexible querying and organization of the messages regardless of the message type.

12 Claims, 11 Drawing Sheets

INTEGRATED MESSAGING USER INTERFACE WITH MESSAGE-BASED LOGGING

BACKGROUND OF THE INVENTION

1. The Field of the Invention

The present invention relates to networking technologies; and more specifically, to an integrated message user interface in which the user experience is standardized regardless of the type of message, and in which logs are maintained on a per-message basis thereby facilitating organization of the messages.

2. Background and Related Art

Communication is an essential need of humankind. The advent of the telephone represents one of the most important advances in communication technology, allowing real-time audio conversations to occur even over vast distances. As humanity progresses further into the information age, we find increasing diversity in the number of technologies that may be used to electronically communicate. For example, e-mail, instant messaging, shared windows, and electronic whiteboarding are all in common use.

Even telephone technology alone has greatly diversified when telephone technology is defined as any networking technology that facilitates real-time audio conversations. For example, one can now use the conventional regular land-line telephone using Plain-Old Telephone Service (POTS) to engage in a telephone conversation. Furthermore, new telephone technologies have emerged enabling mobile telephones. Even the standard Internet Protocol (IP) may be used to communicate real-time audio conversations using Voice-over IP (VoIP).

While this vast array of communication technologies has greatly improved our freedom to communicate, it has also presented organizational challenges. For instance, there is typically one application used to engage in instant messaging, another to engage in e-mail, yet another to engage in a telephone call, and so forth. Accordingly, it is quite difficult to organize all communications across message types. This is especially true for synchronous communications such as telephone conversations, instant messaging, shared windows, and the like. Since messages are difficult to organize across message types, it is often difficult to correlate related messages to thereby harness the value provided from the information within the messages. Accordingly, information overload often prevails.

What would therefore be advantageous are mechanisms for organizing messages across a variety of different message types in an intuitive manner.

BRIEF SUMMARY OF THE INVENTION

The foregoing problems with the prior state of the art are overcome by the principles of the present invention, which are directed towards mechanisms for organizing messages across different message types. In accordance with the principles of the present invention, this may be accomplished by using a single integrated user interface in which messages across a variety of different message types are represented in a common way. For instance, messages appear in a general message log regardless of whether they are an e-mail, an instance message, or a telephone call, and regardless of whether the telephone call was over a cell phone network, over the Internet using Voice-over-IF (VoIP), or over regular Plain-Old Telephone Service (POTS) lines.

In one embodiment, the user experience of placing a telephone call is standardized, regardless of the actual telephone technology (Cell Phone, VoIP, or POTS) used to conduct the telephone conversation. A user may simply select a contact from the contacts list, and then select the desired telephone technology used to conduct the telephone call. Also, a general log provides information in a standardized manner regardless of the type of message or call.

In addition to a general log that includes the overall list of messages, each message also has a separate, message-based log that lists information relevant to the contact for the message, any relevant information regarding the message itself and information regarding further communications opened as part of the session related to the message. These separate, per-message logs allow for more flexible querying and organization of the messages regardless of the message type.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The principles of the present invention relate to mechanisms for organizing messages across different message types. This may be accomplished by using a single integrated user interface in which messages across a variety of different message types are represented in a common way. For example, the user experience of placing a telephone call is standardized, regardless of the actual telephone technology (Cell Phone, VoIP, or POTS) used to conduct the telephone conversation. Also, in addition to a general log that includes the overall list of messages, each message also has a separate, message-based log, thereby allowing for more flexible querying of the messages regardless of the message type.

Turning to the drawings, wherein like reference numerals refer to like elements, the invention is illustrated as being implemented in a suitable computing environment. The following description is based on illustrated embodiments of the invention and should not be taken as limiting the invention with regard to alternative embodiments that are not explicitly described herein.

Figure 1:
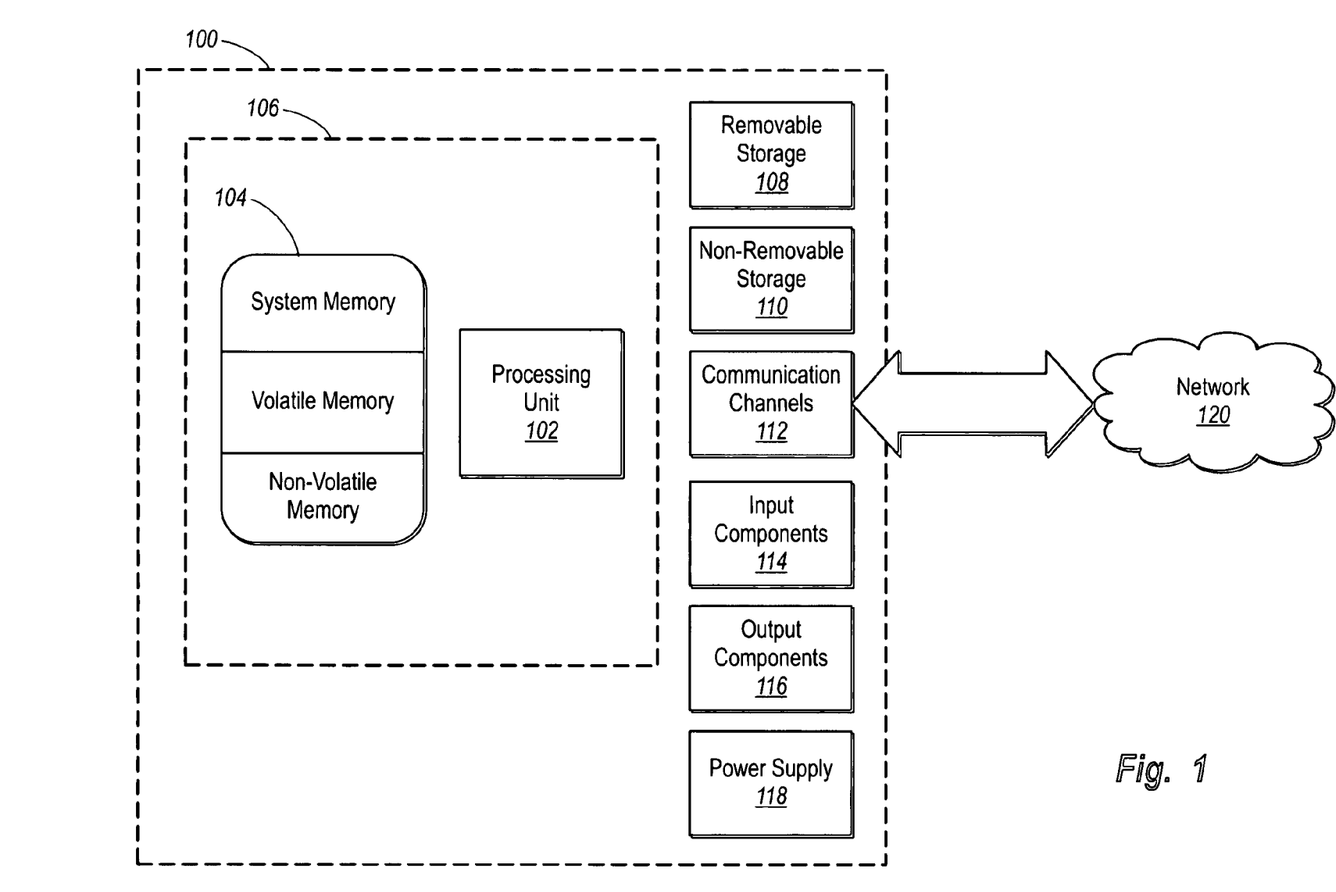
FIG. 1 illustrates a suitable computing system that may implement features of the present invention.

In the description that follows, the invention is described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains them at locations in the memory system of the computer, which reconfigures or otherwise alters the operation of the computer in a manner well understood by those skilled in the art. The data structures where data are maintained are physical locations of the memory that have particular properties defined by the format of the data. However, while the invention is being described in the foregoing context, it is not meant to be limiting as those of skill in the art will appreciate. FIG. 1 shows a schematic diagram of an example computer architecture usable for these devices.

For descriptive purposes, the architecture portrayed is only one example of a suitable environment and is not intended to suggest any limitation as to the scope of use or functionality of the invention. Neither should the computing systems be interpreted as having any dependency or requirement relating to any one or a combination of components illustrated in FIG. 1.

The invention is operational with numerous other general-purpose or special-purpose computing or communications environments or configurations. Examples of well known computing systems, environments, and configurations suitable for use with the invention include, but are not limited to, mobile telephones, pocket computers, personal computers, servers, multiprocessor systems, microprocessor-based systems, minicomputers, mainframe computers, and distributed computing environments that include any of the above systems or devices.

In its most basic configuration, a computing system 100 typically includes at least one processing unit 102 and memory 104. The memory 104 may be volatile (such as RAM), non-volatile (such as ROM, flash memory, etc.), or some combination of the two. This most basic configuration is illustrated in FIG. 1 by the dashed line 106.

The storage media devices may have additional features and functionality. For example, they may include additional storage (removable and non-removable) including, but not limited to, PCMCIA cards, magnetic and optical disks, and magnetic tape. Such additional storage is illustrated in FIG. 1 by removable storage 108 and non-removable storage 110. Computer-storage media include volatile and non-volatile, removable and non-removable media implemented in any method or technology for storage of information such as computer-readable instructions, data structures, program modules, or other data. Memory 104, removable storage 108, and non-removable storage 110 are all examples of computer-storage media. Computer-storage media include, but are not limited to, RAM, ROM, EEPROM, flash memory, other memory technology, CD-ROM, digital versatile disks, other optical storage, magnetic cassettes, magnetic tape, magnetic disk storage, other magnetic storage devices, and any other media that can be used to store the desired information and that can be accessed by the computing system.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in software and hardware or hardware are also possible and contemplated.

Computing system 100 may also contain communication channels 112 that allow the host to communicate with other systems and devices. Communication channels 112 are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media. The term computer-readable media as used herein includes both storage media and communications media.

The computing system 100 may also have input components 114 such as a keyboard, mouse, pen, a voice-input component, a touch-input device, and so forth. Output components 116 include screen displays, speakers, printer, etc., and rendering modules (often called "adapters") for driving them. The computing system 100 has a power supply 118. All these components are well known in the art and need not be discussed at length here.

Figure 2:
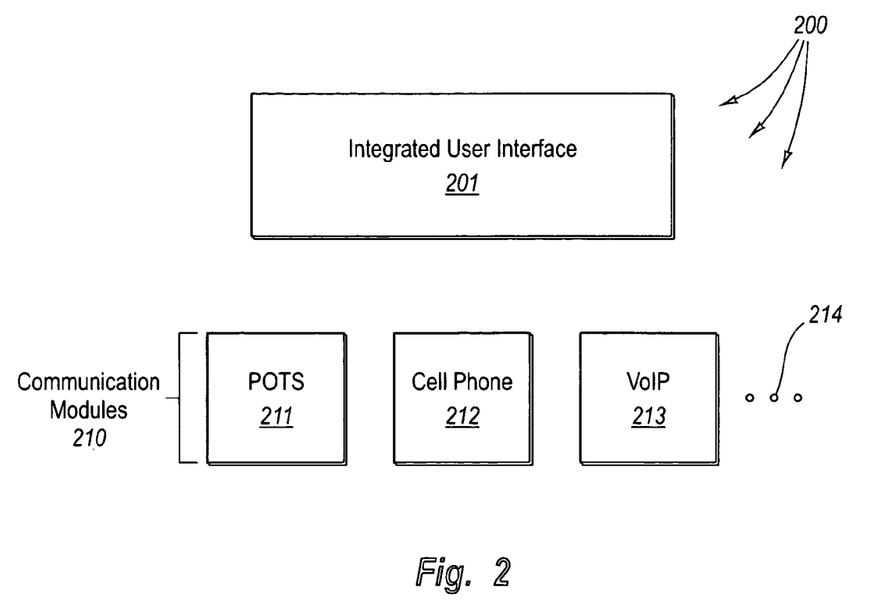
FIG. 2 illustrates an example software architecture that may be used to provide a unified user experience when placing or receiving a telephone call regardless of the telephone technology used to facilitate the call.

FIG. 2 illustrates an example software architecture 200 that may be used to provide a unified user experience when placing or receiving a telephone call or when engaging in another form of communication. The software architecture 200 includes an integrated user interface 201 as well as communication modules 210. The integrated user interface 201 and each of the communication modules 210 may be implemented in the context of FIG. 1 by processing unit 102 executing computer-executable instructions. The computer-executable instructions may be included in the system memory 104, either in the volatile portion or the non- volatile portion. Upon executing the computer-executable instructions, instances of the integrated user interface 201 and the various communication modules 210 may be instantiated in the system memory 104. However, as previously mentioned, the principles of the present invention may be implemented by any computing system that has a processor and a system memory, and is not limited to the specific environment illustrated in FIG. 1.

The communication modules 210 include various components that are each capable of communicating using a particular communication technology. Some of these communication technologies may involve telephone technologies in which a caller and a callee may engage in a real-time telephone conversation.

For example, the communication modules 210 include a POTS module 211 capable of placing telephone calls over Plain-Old Telephone Service (POTS) networks in response to a direct or indirect command from the integrated user interface 201. Furthermore, the cell phone module 212 places telephone calls over a cellular network such as a GSM network. Alternatively or in addition, the cell phone module 212 may connect to a separate cell phone to cause that cell phone to place a telephone call using, for example, BLUETOOTH. In addition, a VoIP module 213 places a telephone call using Voice-over IP technology.

Additional modules may also be included as represented by the horizontal ellipses 214 to place telephone calls using other telephone technology, whether now developed or whether to be developed in the future. The additional communication modules 214 may also represent modules that facilitate non-telephonic forms of communication such as e-mail, instant messaging, shared windows, shared applications, whiteboarding, or the like.

Figure 4:
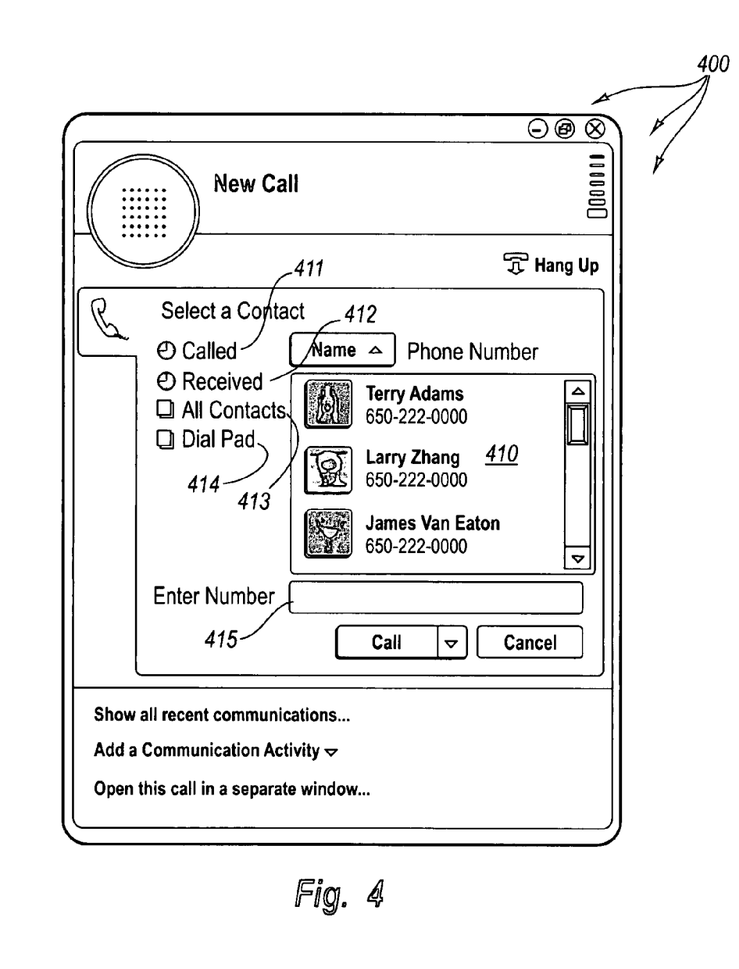
FIG. 4 illustrates a user interface that may be presented to the user to allow the user to select a callee with whom to initiate a telephone call.
Figure 5:
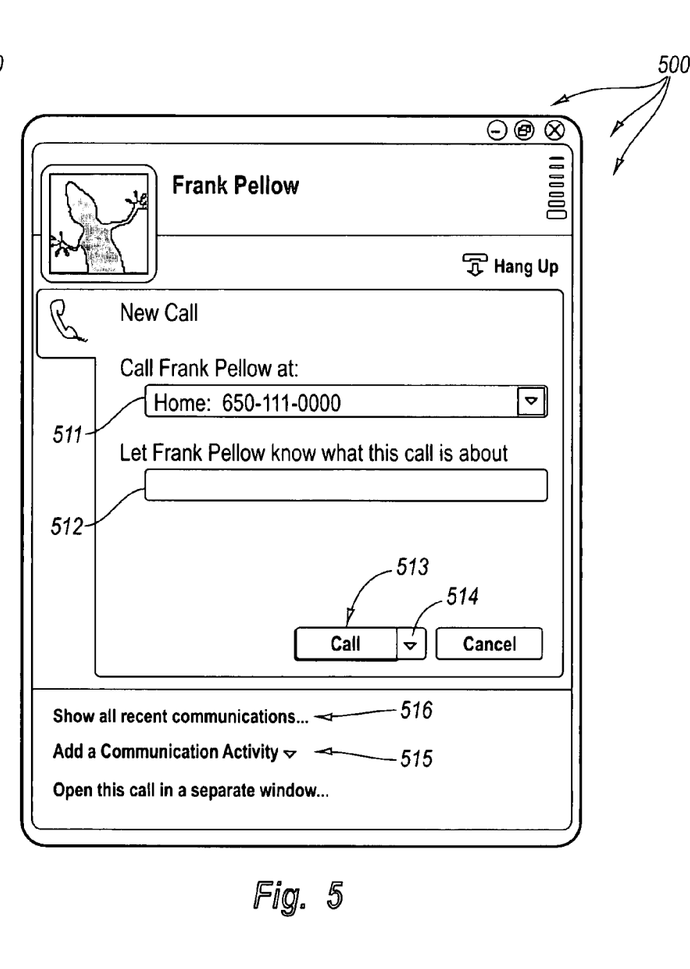
FIG. 5 illustrates a user interface that allows the user to select a telephone technology to use when placing a call to a selected callee.
Figures 8, 9:
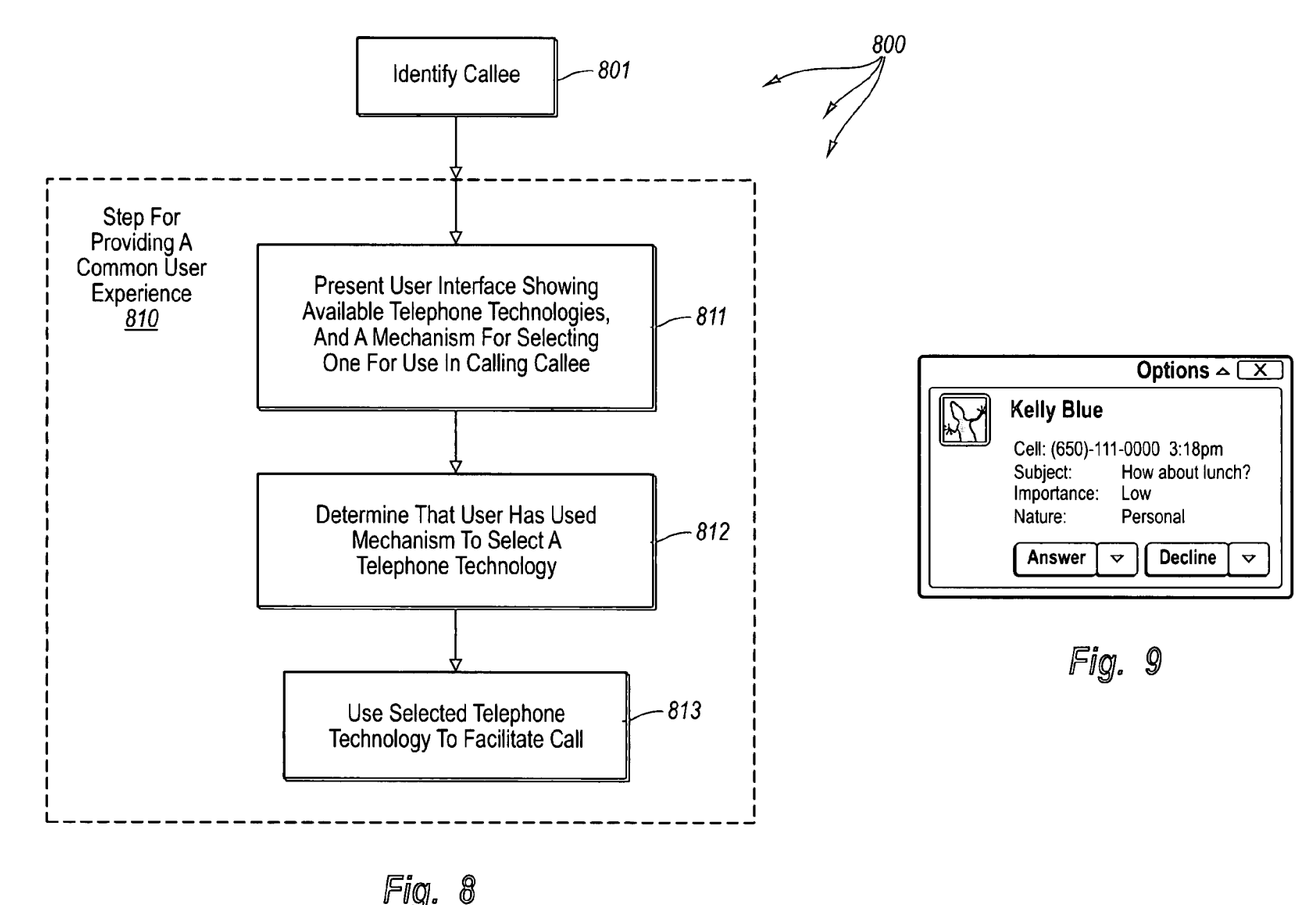
FIG. 8 illustrates a flowchart of a method for providing a user with a common user interface regardless of the telephone technology used to place a telephone call.
FIG. 9 illustrates a user interface notifying the callee of the identity of the caller and the telephone technology used to place the call.

The operation of the software architecture 200 of FIG. 2 will be described with respect to a specific user interface described with respect to FIGS. 4 and 5 and with respect to the method illustrated in FIG. 8. FIG. 8 illustrates a flowchart of a method 800 for providing a user with a common user interface regardless of the telephone technology used to place a telephone call.

According to the method 800, the computing system identifies a callee (act 801). Specifically, the user may identify the callee through a user interface. An example of such a user interface is illustrated in FIG. 4 as user interface 400. The user interface 400 includes a scrollable contact window 410 that includes a list of possible callees. Icon 411 may be selected to display all contacts who have been previously called by the user. Icon 412 may be selected to display all contacts who have previously called the user. Icon 413 may be selected to display all of the user's contacts. Alternatively, instead of identifying the call directly, the user may simply enter the telephone number into phone number field 415, or may select the dial pad icon 414 to use a visual representation of a keypad to enter the phone number.

Returning to FIG. 8, regardless of how the callee is identified, the method 800 proceeds to a functional, result-oriented step for providing a common user experience for initiating a telephone conversation with the callee regardless of the telephone technology used (step 810). While this step could be accomplished in any manner, FIG. 8 illustrates this step as including corresponding acts 811 through 813.

Specifically, the computing system presents a user interface that shows a number of telephone technologies that may be used to engage in a telephone call with the callee (act 811). The user interface further includes a mechanism for a user to select one of the plurality of telephone technologies to be used to engage in the telephone call. FIG. 5 illustrates an example 500 of such a user interface. For instance, here the user has selected a callee named "Frank Pellow" at home as the callee. The callee is identified in callee field 511. The user interface also includes a subject field 512 wherein the user may insert a subject of the telephone call. When calling the callee, the callee may be informed of the subject of the call, giving the callee more information relevant to whether or not the callee wants to accept or decline the call.

The user interface 500 includes a call button 513, which prompts the relevant communications module to initiate the telephone call. If there is more than one possible telephone technology to use when calling the callee, a drop down element 514 may be provided. This drop down element 514 may be used to list all possible telephone technologies that may be used to call the designated callee. For example, the listed telephone technologies may include POTS, Cell Phone, VoIP, or others.

If multiple telephone technologies are possible to place the call, the caller may select a telephone technology to use by using the drop down element 514. Alternatively, the user may simply select the call icon 513 to allow the computing system to identify a default calling mechanism from among the different telephone technologies available.

Figure 10:
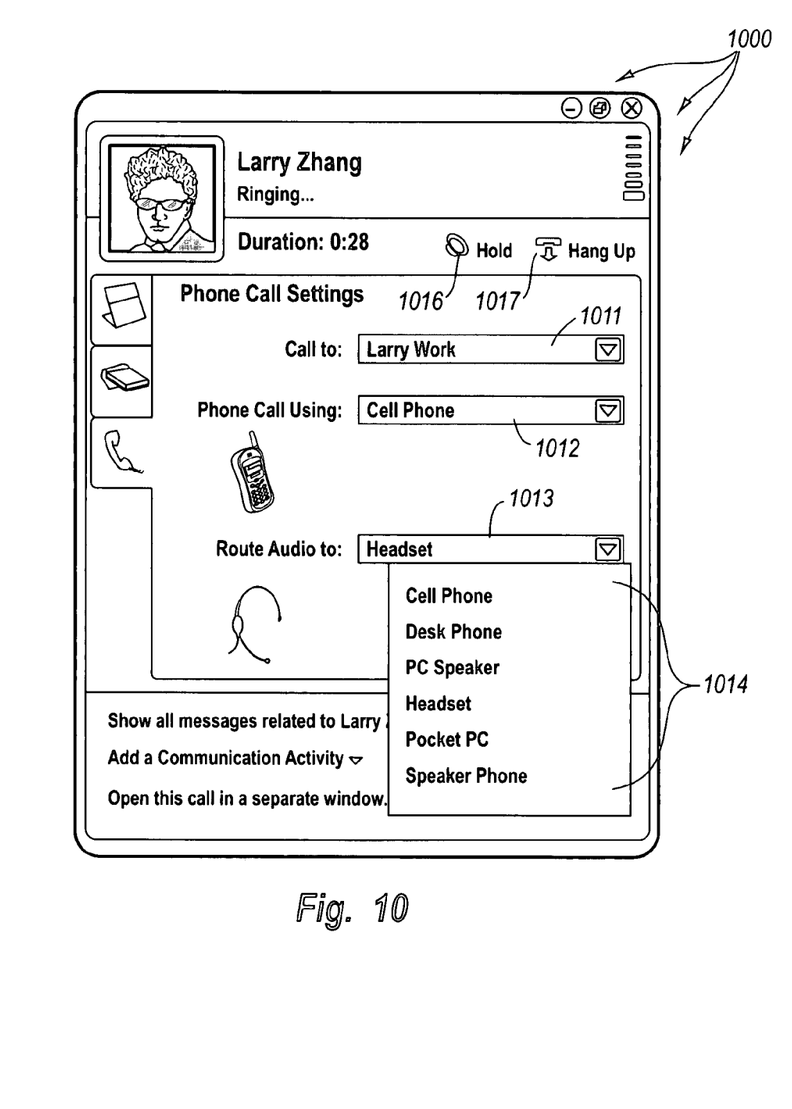
FIG. 10 illustrates a user interface that may be presented to the user to allow the user to selectively adjust various call settings.

FIG. 10 illustrates a user interface 1000 that may be presented to the user to allow the user to adjust various call settings. The user interface 1000 includes field 1011 for selecting a number from among different numbers (e.g., home, work, cell, VoIP) corresponding to a callee. Field 1012 can be used for selecting a telephone technology (e.g., POTS, cell, VoIP) to initiate a call. Field 1013 can be used for selecting an audio device to use during a call. Filling in each of the fields 1011, 1012, and 1013, can include selecting items from a drop down list. For example, the item for field 1013 can be selected from among the items in drop down list 1014. Controls 1016 and 1017 can be selected to place a call on hold or terminate a call respectively.

In any case, once the user has selected a telephone technology, the computing system determines that the user has interfaced with the user interface to select one of the plurality of telephone technologies to use to engage in the telephone call (act 812). The computing system then uses the selected telephone technology to facilitate the telephone call (act 813). For example, if the user selects VoIP, the appropriate VoIP module 213 is used to place the telephone call.

Figure 6:
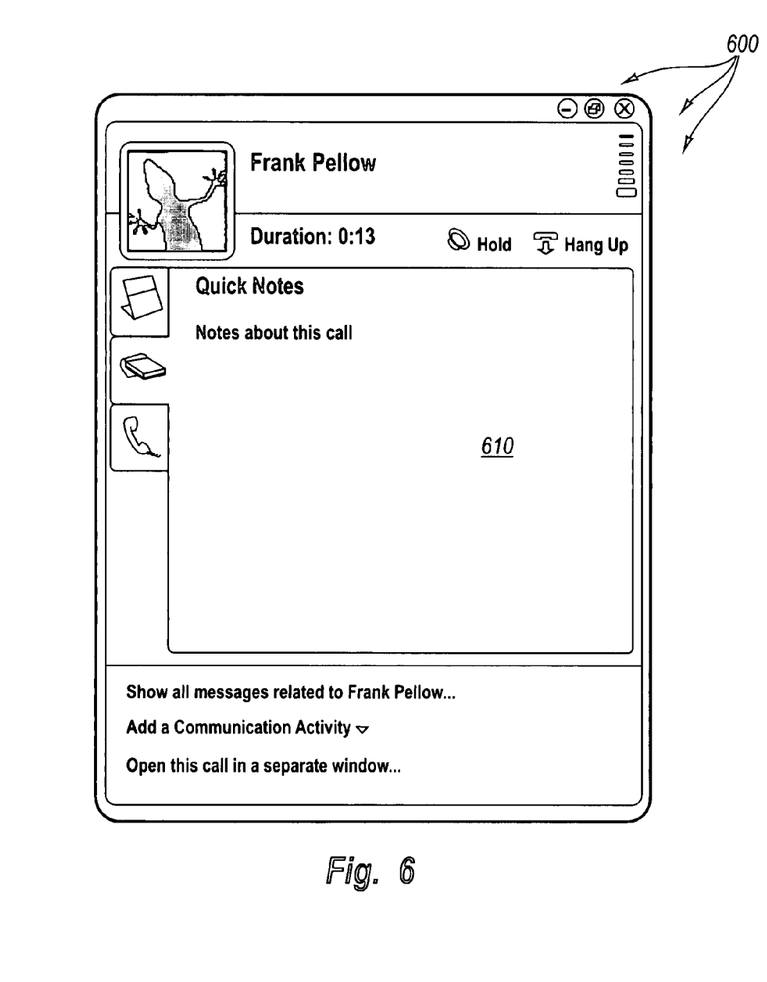
FIG. 6 illustrates a user interface that allows the user to draft notes associated with a telephone call.

Once a telephone call is being engaged in, the user may use the user interface to allow for further communications associated with the telephone call. This mechanism is represented in FIG. 5 by the icon 515 labeled "Add a Communication Activity". The user may select from the drop down list to add further communications such as, for example, instant messages, shared windows, shared applications, whiteboarding, e-mail, associated related documents, and notes. FIG. 6 illustrates a user interface 600 that may be displayed upon selecting to add notes to a phone call, whether concurrent with the telephone call, or whether after the telephone call. Alternatively or in addition, the user may select the "all recent communications" icon 516 to view all recent communications received from the callee across different message types, and or received regarding the designated subject. The use of per-message logs described further below facilitates the efficient querying and presenting of these related communications.

Figure 11A:
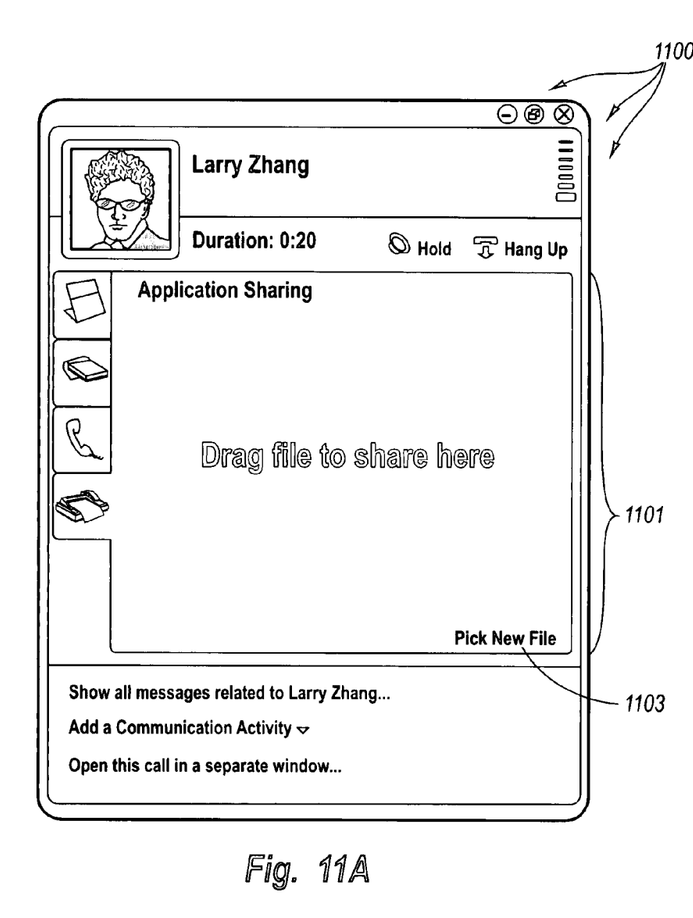
FIG. 11A illustrates a user interface that may be presented to allow the user to initiate application sharing.
Figure 11B:
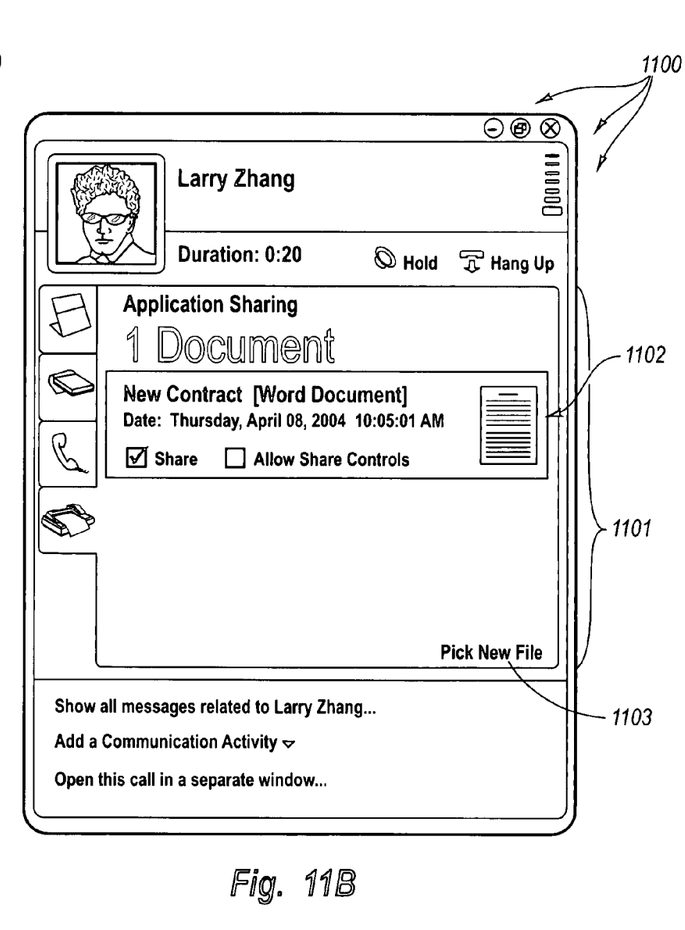
FIG. 11B illustrates a user interface that may be presented to indicate a document has been selected for application sharing.

FIG. 11A illustrates a user interface 1100 that may be presented to allow the user to initiate application sharing. To initiate application sharing a caller can drag a document into window 1101 or can select a document from an open file menu (e.g., Pick New File option 1103). FIG. 11B illustrates the user interface 1100 that may be presented to indicate a document has been selected for application sharing. As depicted in FIG. 118, document 1102 has been selected for application sharing. Control data associated with document 1102, including a date and time and sharing properties, is also depicted.

Figure 12A:
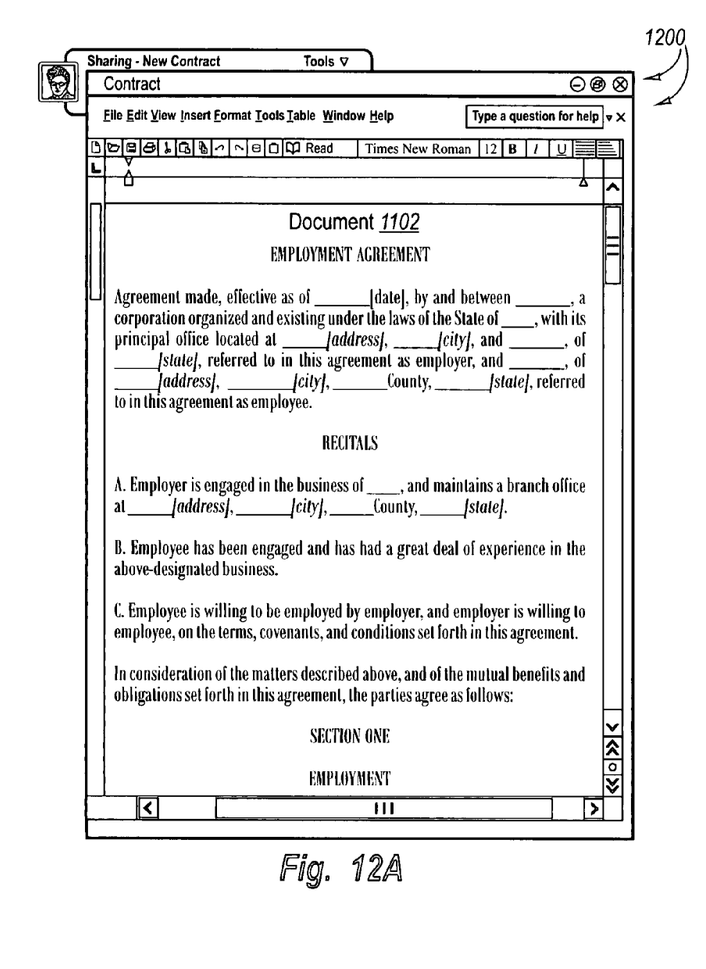
FIG. 12A illustrates a user interface that may be presented to indicate that an application is being shared.

Selection of a document that has been made available for sharing can cause an appropriate application to execute and be shared between a caller and a callee. For example, selection of document 1102 can cause an application to execute and be shared. FIG. 12A illustrates a user interface 1200 that may be presented to indicate that an application is being shared. Sharing bar 1203 and person icon 1202 indicate that application 1201 is being shared with a contact represented by the person icon 1202. Tools 1204 can provide access to a drop down list of tools that can be used to manipulate document 1102.

Figure 12B:
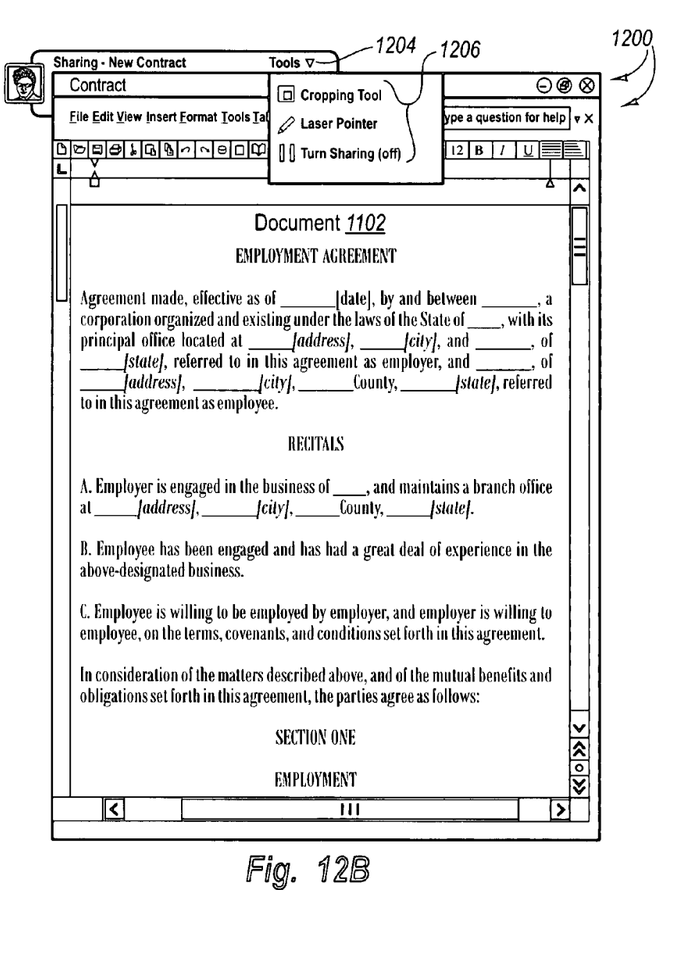
FIG. 12B illustrates a user interface that may be presented to indicate available tools that can be shared between a caller and a callee to manipulate a shared application.

FIG. 12B illustrates the user interface 1200 that may be presented to indicate available tools that can be shared between a caller and a callee to manipulate a shared application. As depicted in FIG. 12B, tools 1204 has been selected to cause presentation of drop down list 1206. Items from drop down list 1206 can be used to manipulate document 1102. Drop down list 1206 provides access to a cropping tool for reducing the visible portion of the application, a laser pointer that can be shared between a caller and a callee to point to locations in document 1102, and an option for turning off application sharing.

The callee initiates the call using the integrated user interface 201. The call is placed using the selected telephone technology. When the call is received, an integrated user interface on the callee computing system may be displayed showing the identity of the caller, the telephone number and technology used to place the call, and potentially the subject, importance and or nature of the telephone call. An example of such a user interface is illustrated in FIG. 9. The callee may then accept or decline the telephone call using that user interface. The user interface used to accept or decline the telephone call may appear the same regardless of the telephone technology used with perhaps the only difference being telephone technology identified in the user interface.

Figure 13:
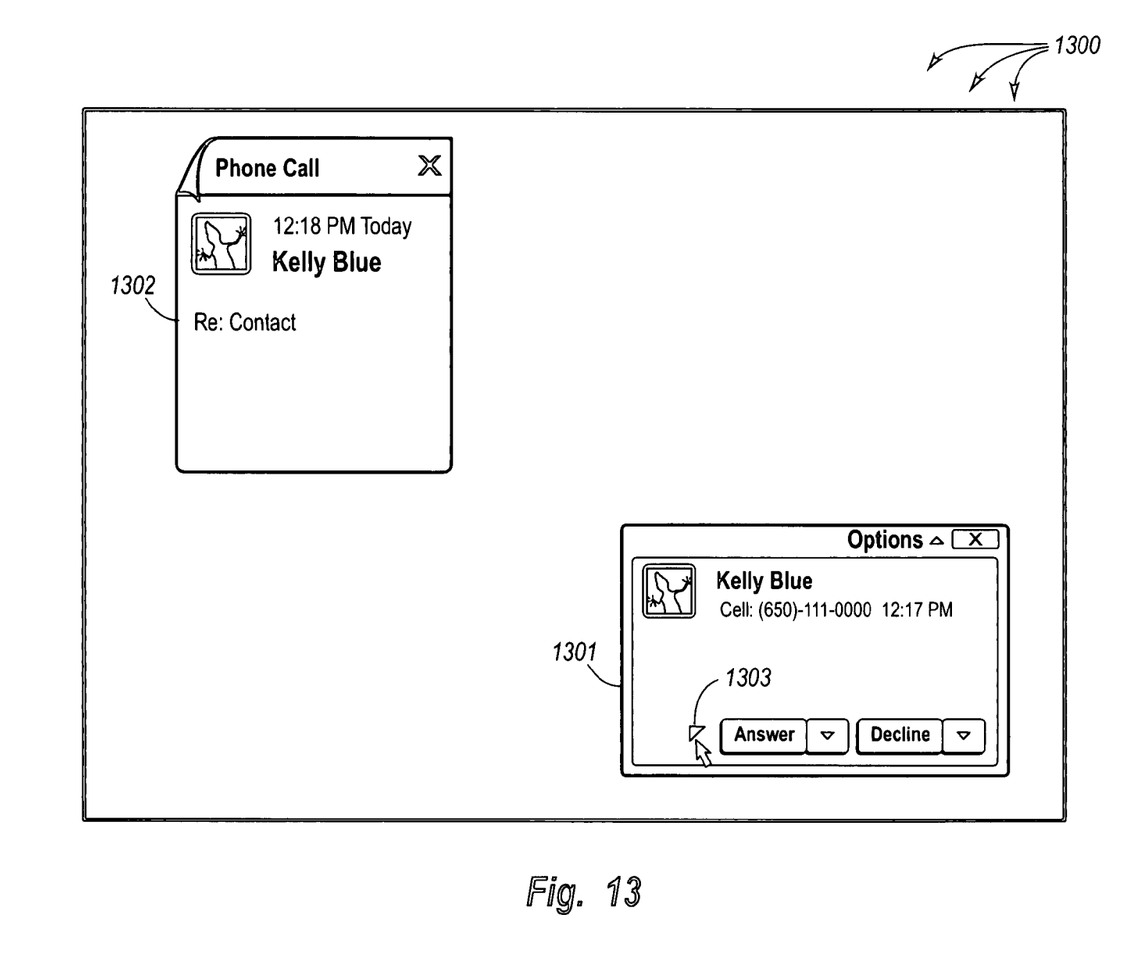
FIG. 13 illustrates a user interface that may be presented to indicate a reminder for a received call.

In some embodiments, when a notification for a call is received, a reminder for that call is created by selecting an appropriate control. FIG. 13 illustrates a user interface 1300 that may be presented to indicate a reminder for a received call. Window 1301 depicts an integrated user interface similar to that of FIG. 9 showing the identity of a caller. Within window 1301, flag 1303 can be selected to cause reminder 1302 to be presented. Reminder 1302 can be utilized to store call related information corresponding to the received call (represented by window 1301). For example, a user icon, user name, time of call, call subject, and phone number can be included in reminder 1302.

Smaller versions of a user-interface can all also be presented. These smaller versions of the user-interface can include some of the functionality described in FIGS. 4, 5, and 10. A user-interface can include a sidebar that provides access to various parts of the user-interface functionality. An appropriate selection of a control on the sidebar can cause a smaller version of a user-interface to be presented.

Figure 14A:
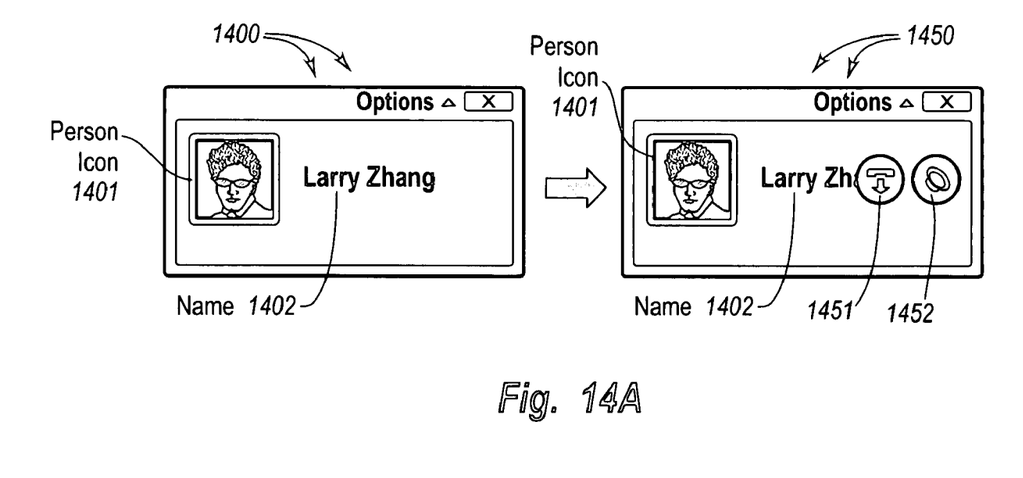
FIG. 14A illustrates smaller versions of a user interface that may be presented to a user.

FIG. 14A illustrates smaller versions of a user interface 1400 and 1450 that may be presented to a user. Smaller version 1400 depicts person icon 1401 and name 1402 indicating a callee. A smaller version of a user-interface can also include a subset of the controls available from other user interfaces. Using an input device, a user can select controls for corresponding to the subset of functionality. For example, smaller version 1450 further depicts controls 1451 and 1452 that can be selected to terminate and hold a call respectively.

Figure 14B:
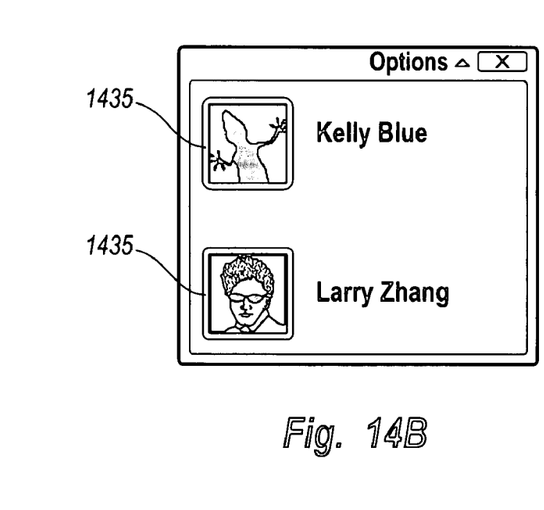
FIG. 14B illustrates a smaller version of a user interface that may be presented to a user.

FIG. 14B illustrates smaller versions of a user interface 1425 and 1435 that may be presented to a user. FIG. 14B depicts that one or more smaller versions of user interface can be stacked or others placed in close proximity to one another to provide call control for a plurality of calls. Each smaller version 1425 and 1435 can include controls similar to smaller version 1450 (not shown).

Figure 3:
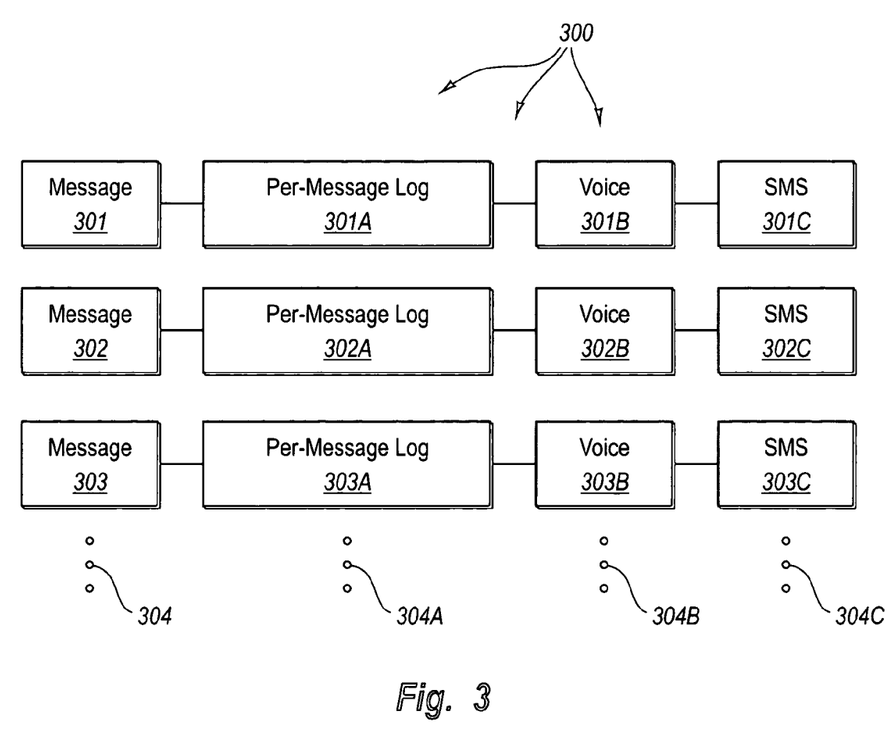
FIG. 3 illustrates a message data structure having a number of extensions including a per-message log that facilitates more flexible querying and organization of the messages.

FIG. 3 illustrates a data structure 300 that allows for further flexibility in organizing and querying regarding messages. The data structure includes multiple messages including messages 301, 302, 303, amongst potentially many more as represented by the vertical ellipses 304. Each message has associated extension data structures including a per-message log 301A through 304A, a possible voice structure 301B through 304B, and a possible corresponding SMS structure 301C through 304C. The voice and SMS structures may include corresponding voice recordings, or SMS messages.

The per-message logs 301A through 304A each include information relevant to its corresponding message. For example, the per-message log may include information relevant to the other party to the communication such as, for example, a display name, an e-mail address, a phone number, a user icon, a contact reference number, or the like. The per-message log may also include information specific to the message. In this case of a telephone call, this may include, for example, the time the call was initiated, the call duration, the subject of the call, whether or not the call was accepted or declined, or whether or not additional communications related to the call were initiated.

Figure 7:
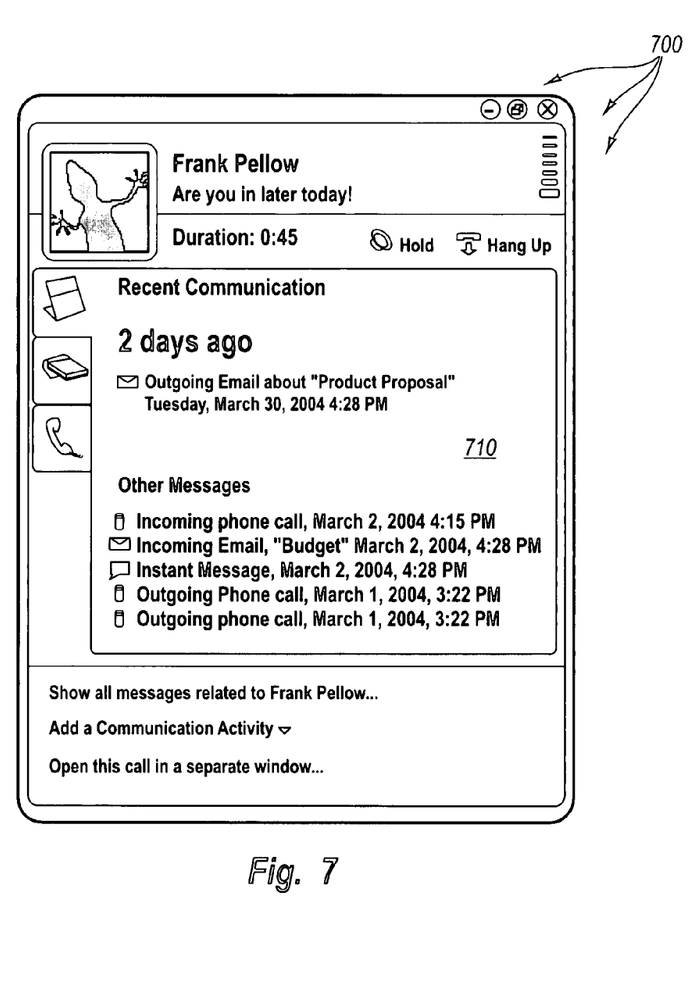
FIG. 7 illustrates a user interface showing the flexible nature of how the messages may be organized and queried, even across different message types.

By maintaining logs on a per-message basis, querying, searching, and organizing the message becomes much easier. For example, one could query for all messages within a one week period that was two months ago that include the word "tax" in their subject. Also, one could query for the last time any contact was made with a particular individual. Furthermore, one could query for the top five people with whom the individual engages in telephone conversations ranked in order of accumulated call duration. Also, as mentioned above, the query may be for related messages by sender or subject in response to the user having selected the "Show all recent communications" icon 516. The number of possibilities is endless. In operation, each per-message log may be applied as input against an inverse query engine, which outputs only those logs that satisfy the query. FIG. 7 illustrates an example of a user interface 700 that shows the results of a query for recent communications with a particular person. Note how the messages include a wide variety of message types including phone calls, e-mails, and instant messages.

Figure 15:
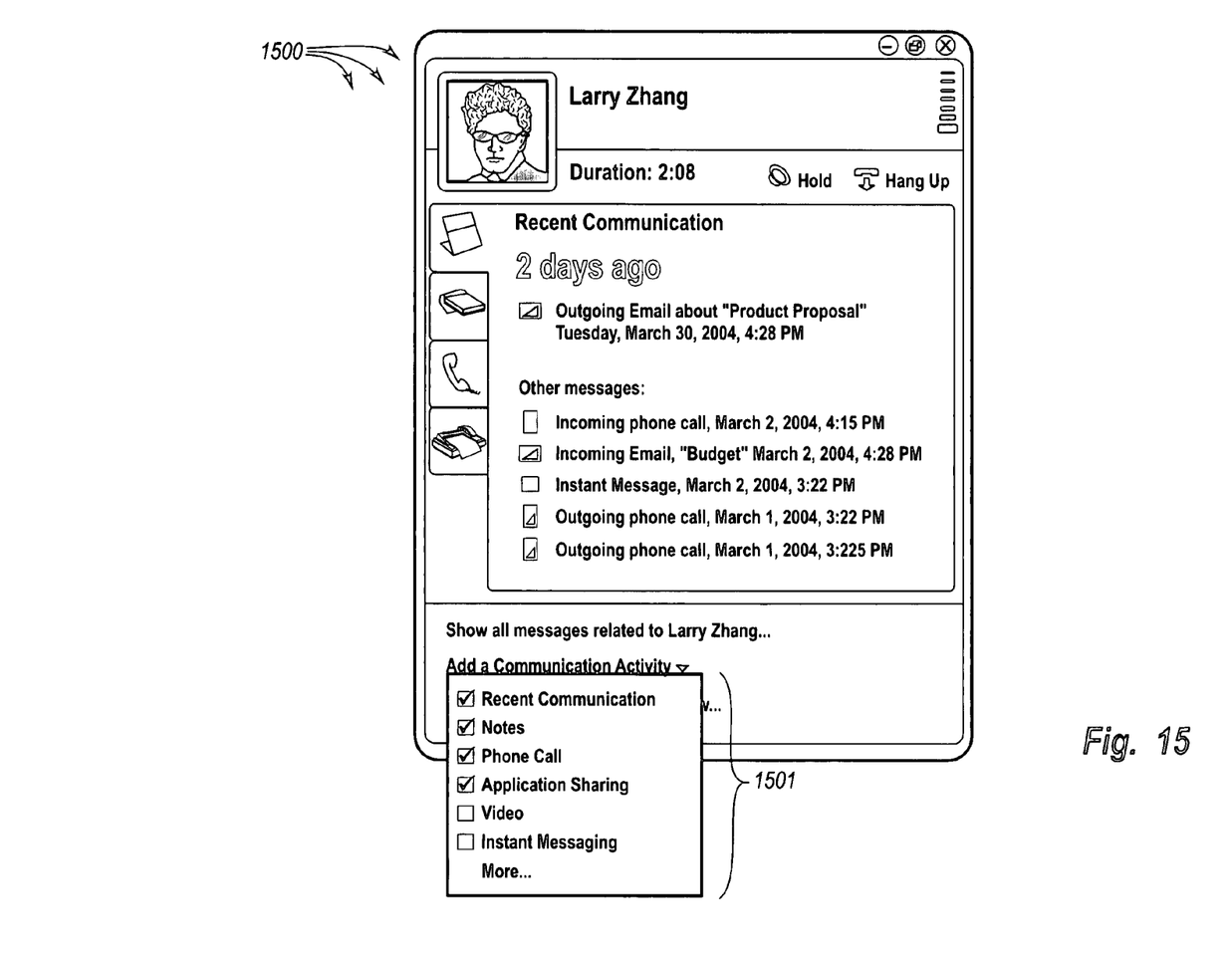
FIG. 15 illustrates a user interface showing the flexible nature of how the messages may be organized and queried, even across different message types and showing a drop down list of communication activities.

FIG. 15 illustrates a user interface 1500 showing the flexible nature of how the messages may be organized and queried, even across different message types and showing a drop down list 1501 of communication activities. Items on drop down list 1501 can be selected to add further communications, such as, for example, instant messages, shared windows, shared applications, white boarding, e-mail, associated related documents, and notes. These further communications can be implemented as previously described. Although depicted with respect to a user interface for organizing and querying messaging (similar to FIG. 7). drop down list 1501 can be accessed form other user interfaces, such, as for example, as depicted in FIGS. 4, 5, 6, 10, 11A, 11B, and as a control of a smaller version user interface e.g., smaller versions 1400, 1450, 1425, and 1435) when appropriate.

Accordingly, the principles of the present invention provide a powerful mechanism for organizing, searching and querying messages across different message types, and provide the user with a common user experience across message types, thereby significantly improving the state of the art.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired secured by United States Letters Patent is:

1. In a computing system that is capable of using a plurality of telephone technologies to facilitate telephone conversations, a method for providing a user of the computing system with a user interface that allows the user the ability to select a subject field to include with a type of telephone technology selected to use at the time a call is placed, the method comprising the following:

an act of identifying a callee;

an act of presenting a user interface that may be used to place a telephone call with the callee, wherein the user interface provides a standard user experience regardless of which of the plurality of telephone technologies is used to initiate a telephone call to the callee, wherein the plurality of telephone technologies connect a plurality of different types of telephone devices, and wherein the user interface comprises:

a contact window that includes:

a first input field for displaying an indication of a telephone number used to contact the callee;

a subject field that allows a user to insert a subject of the telephone call prior to initiation of the telephone call; and a selectable call field usable to initiate the telephone call, wherein the call field includes a link to display, in the contact window, the plurality of telephone technologies usable to initiate the telephone call with the callee for selection by the user;

an act of receiving input to the subject field that allows the user to inform the callee of the subject of the telephone call;

after presenting the user interface with the contact window and displaying the indication of the telephone number of the callee, an act of receiving input selecting one telephone technology from the plurality of telephone technologies from the call field in the contact window; and upon receiving user input to initiate the telephone call, an act of sending the subject field to the callee in a dial-up request to give the callee more information relevant to whether or not the callee wants to accept or decline the call.

2. A method in accordance with claim 1, wherein the method further comprises:

an act of using the selected telephone technology to initiate the telephone call.

3. A method in accordance with claim 2, wherein the plurality of telephone technologies include two or more of POTS, cell phone communications, or Voice-over-IP.

4. A method in accordance with claim 1, wherein the user interface further includes a mechanism for allowing notes to be drafted and associated with the telephone conversation.

5. A method in accordance with claim 1, wherein the user interface further includes a mechanism for allowing further communications to be initiated with the callee that are not the same as the telephone technology selected for engaging in the telephone call.

6. A method in accordance with claim 5, wherein the further communications include one or more of instant messaging, e-mail, whiteboarding, shared windowing, and shared applications.

7. A method in accordance with claim 1, wherein the user interface further includes a mechanism for viewing recent communications related to the telephone call.

8. A method in accordance with claim 7, wherein the recent communications are recent communications with the callee regardless of the message type of those recent communications.

9. A method in accordance with claim 7, wherein the recent communications are recent communications regarding the same subject as the telephone call regardless of the message type of those recent communications.

10. A method in accordance with claim 1, further comprising the following:

an act of generating a per-message log that is dedicated to the telephone conversation.

11. A method in accordance with claim 10, further comprising:

an act of accessing a query regarding a plurality of messages of which the computing system has a record, each of the messages having an associated per-message log; and an act of using the per-message logs to formulate a response to the query.

12. In a computing system that is capable of using a plurality of telephone technologies to facilitate telephone conversations, a method for providing a user of the computing system with a user interface that allows the user the ability to select a subject filed to include with a type of telephone technology selected to use at the time a call is placed, the method comprising the following:

presenting a user interface that may be used to place a telephone call from a user to at least one contact, wherein the user interface provides a standard user experience regardless of which of POTS, cell, and VOIP telephone technologies supported by the user interface is used to initiate a telephone call to the contact, and wherein the POTS, cell, and VOIP telephone technologies connect a plurality of different types of telephone devices, and the user interface comprises:

(i) a contact window at a first tab, the contact window including:

(a) a first input field for displaying an indication of a telephone number used to initiate a phone call to a selected contact, wherein the first input field includes a plurality of portions including:

(1) a text field identifying a particular telephone number of the selected contact; and (2) a link portion which, upon selection, provides a list of alternative telephone numbers corresponding to the selected contact;

(b) a subject field that allows a user to insert a subject of the telephone call prior to initiation of the telephone call; and
(c) a selectable call field usable to initiate the telephone call with the selected contact, wherein the call field includes a plurality of portions including:
  (1) a button portion for initiating the telephone call; and
  (2) a link portion which, upon selection, provides a list of selectable and available telephone technologies usable to initiate the telephone call with the contact, including at least POTS, VOIP, and cell, and wherein one of the telephone technologies is set as a default for automatic selection when no other contrary selection has been made by the user, and wherein the same link portion is used to identify any of the POTS, VOIP, and cell telephone technologies;
(ii) a notes window at a second tab, the notes window including an input field for the user to add notes regarding the telephone call initiated in the contact window;
(iii) a history window at a third tab, the history window including a history of recent communication with the selected contact, including communication made over diverse types of communication mechanisms; and
(iv) an input window, independent of any tab, wherein the input window is displayed simultaneously with each of the windows at the tabs, and includes a selectable link for enabling a user to add and remove tabs and windows corresponding thereto;

in the contact window, identifying a contact and placing the telephone number corresponding to the identified contact in the text field of the first input field in the contact window;

receiving user input to the subject field that allows the user to inform the contact of the subject of the telephone call;

after presenting the user interface, identifying the contact, and placement of the telephone number of the identified contact in the text field of the first input field in the contact window, receiving input selecting one telephone technology from the plurality of telephone technologies from the call field in the contact window;

upon receiving user input to initiate the telephone call, sending the subject field to the identified contact to give the contact more information relevant to whether or not the contact wants to accept or decline the call, and;

using the selected telephone technology to initiate the telephone call with the identified contact.

* * * * *